H. F. WHEDON.
ENGRAVING MACHINE.
APPLICATION FILED OCT. 15, 1906.
962,686.
Patented June 28, 1910.
10 SHEETS—SHEET 1.
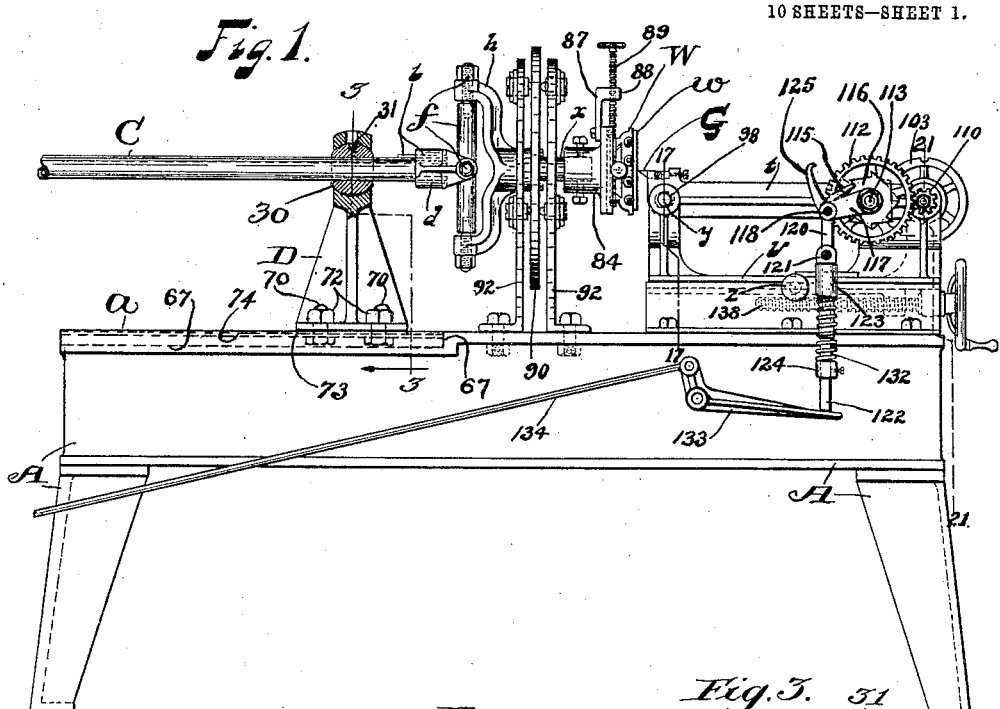
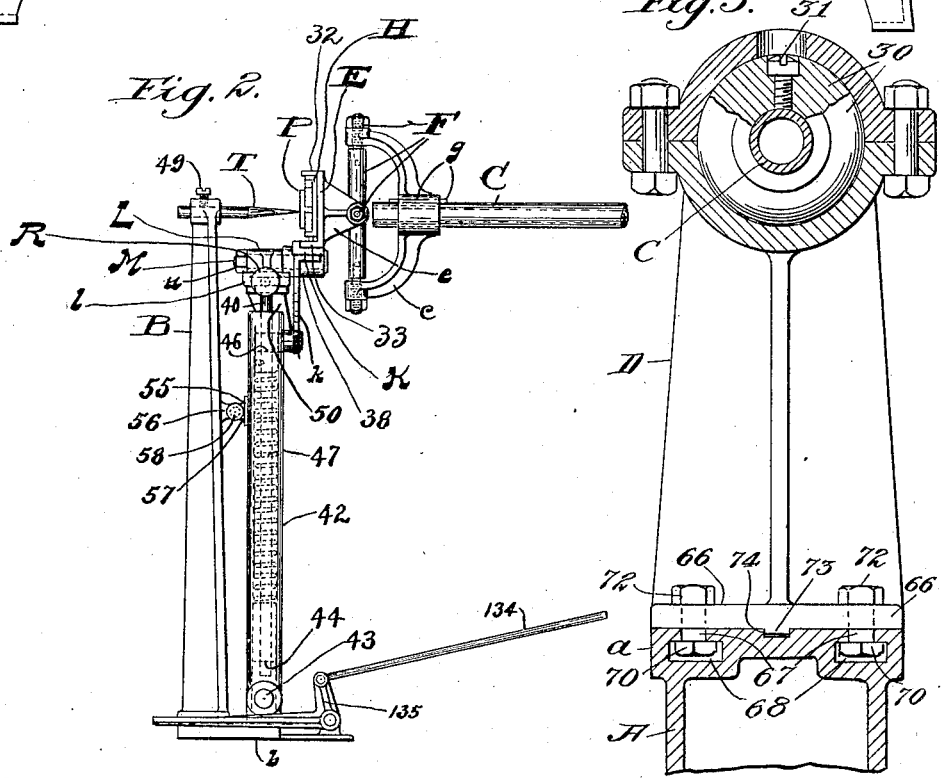
Witnesses:
Edw. Lindmueller
B. C. Brown.
Inventor:
Harry F. Whedon
By
His Attorneys

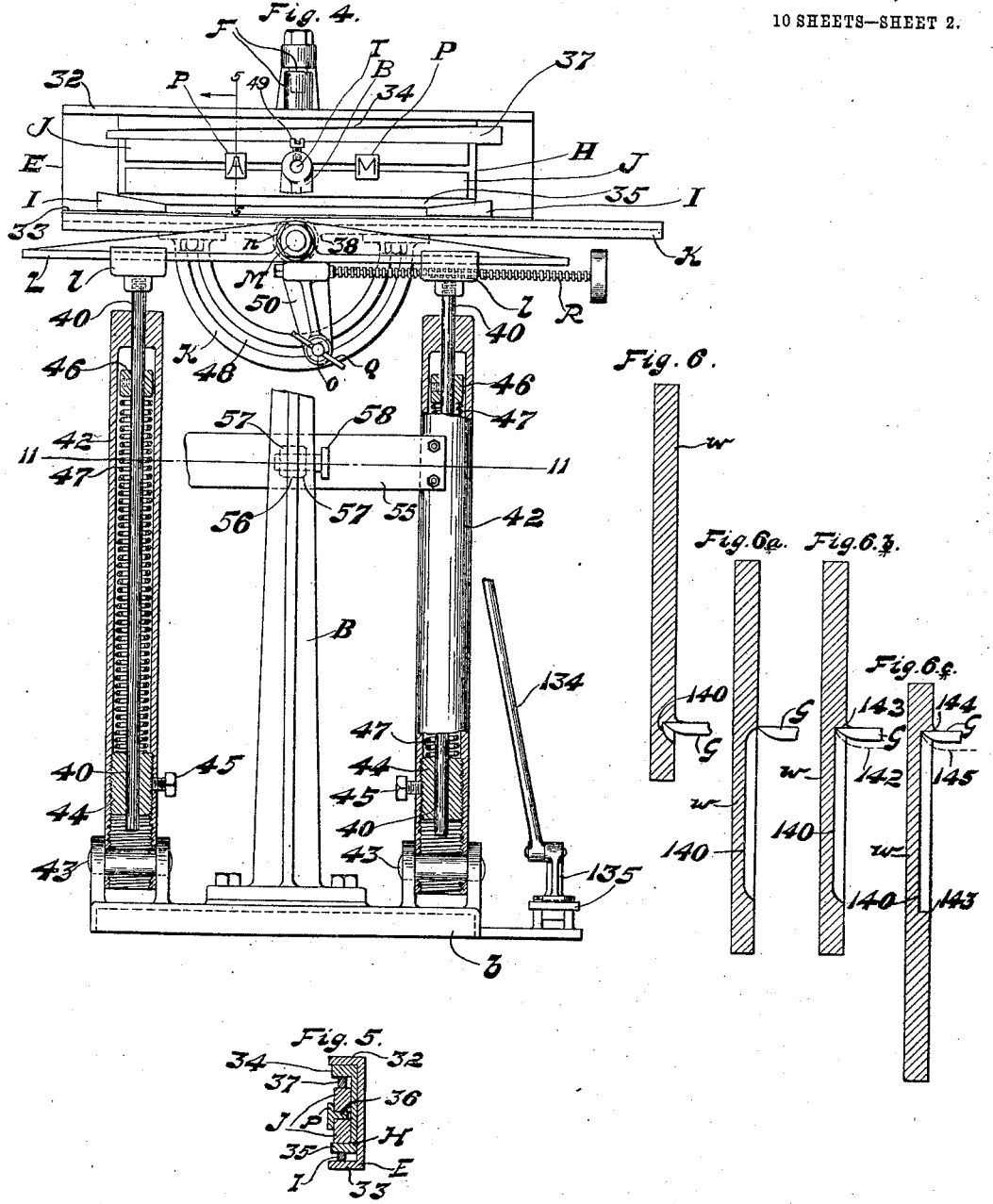

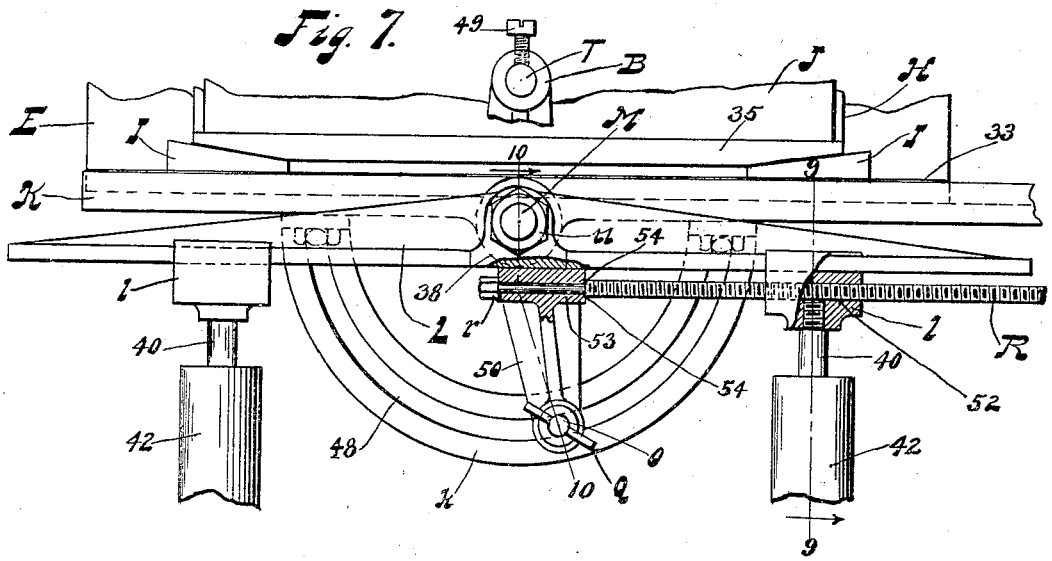
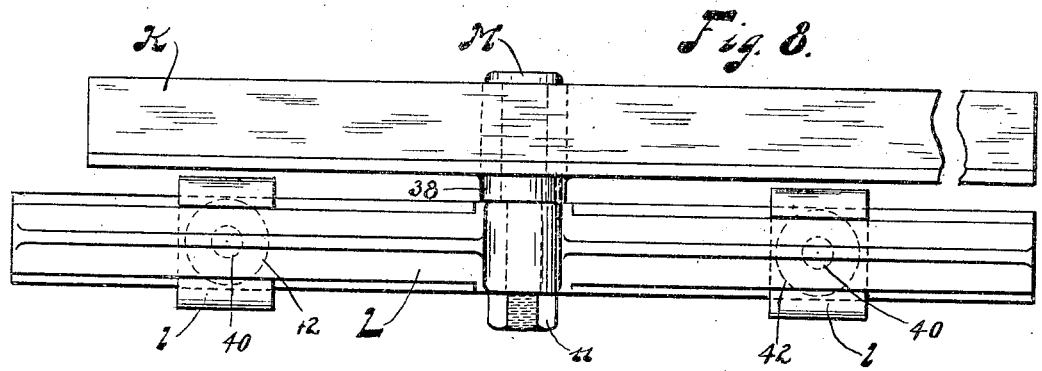

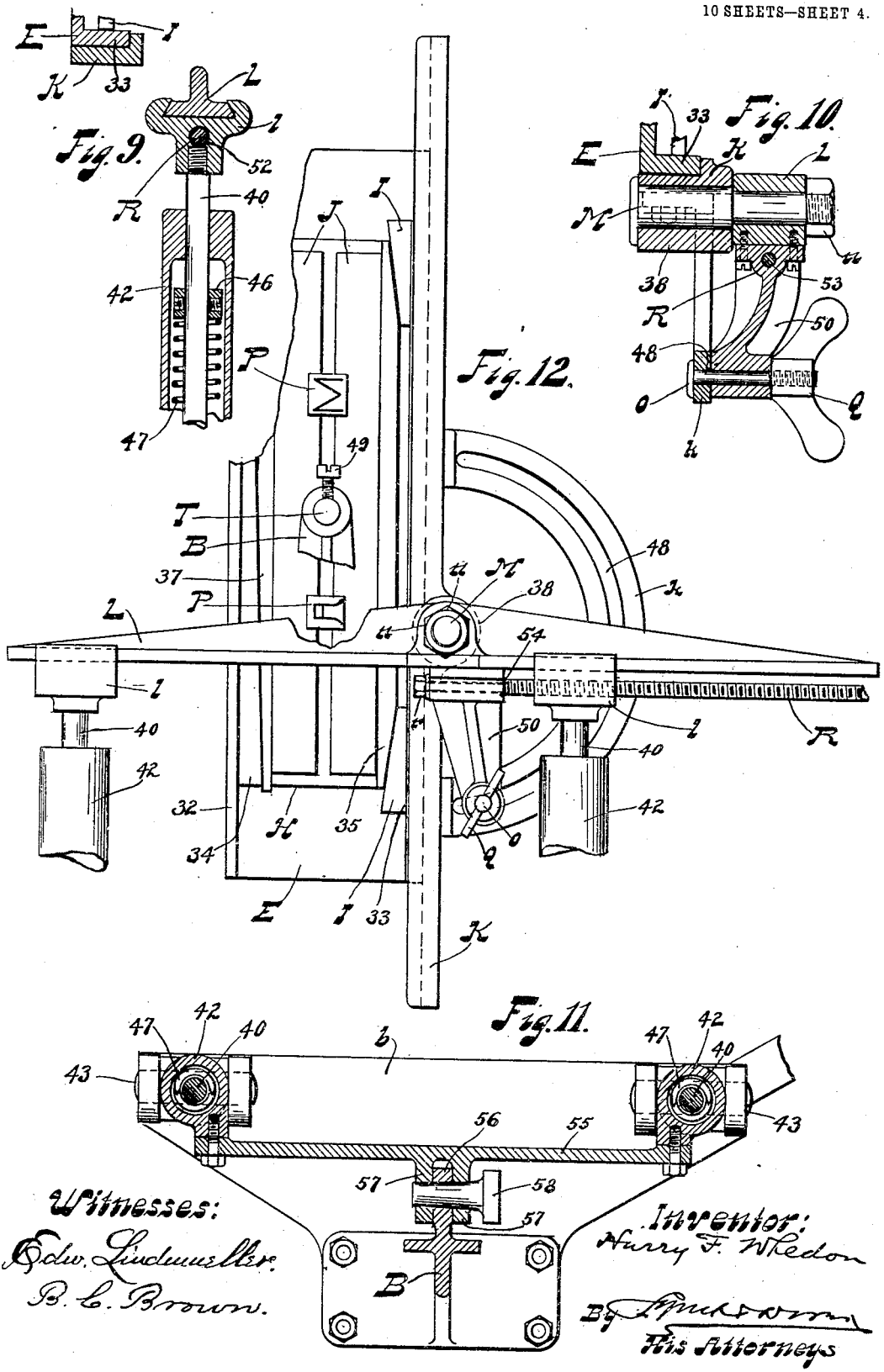

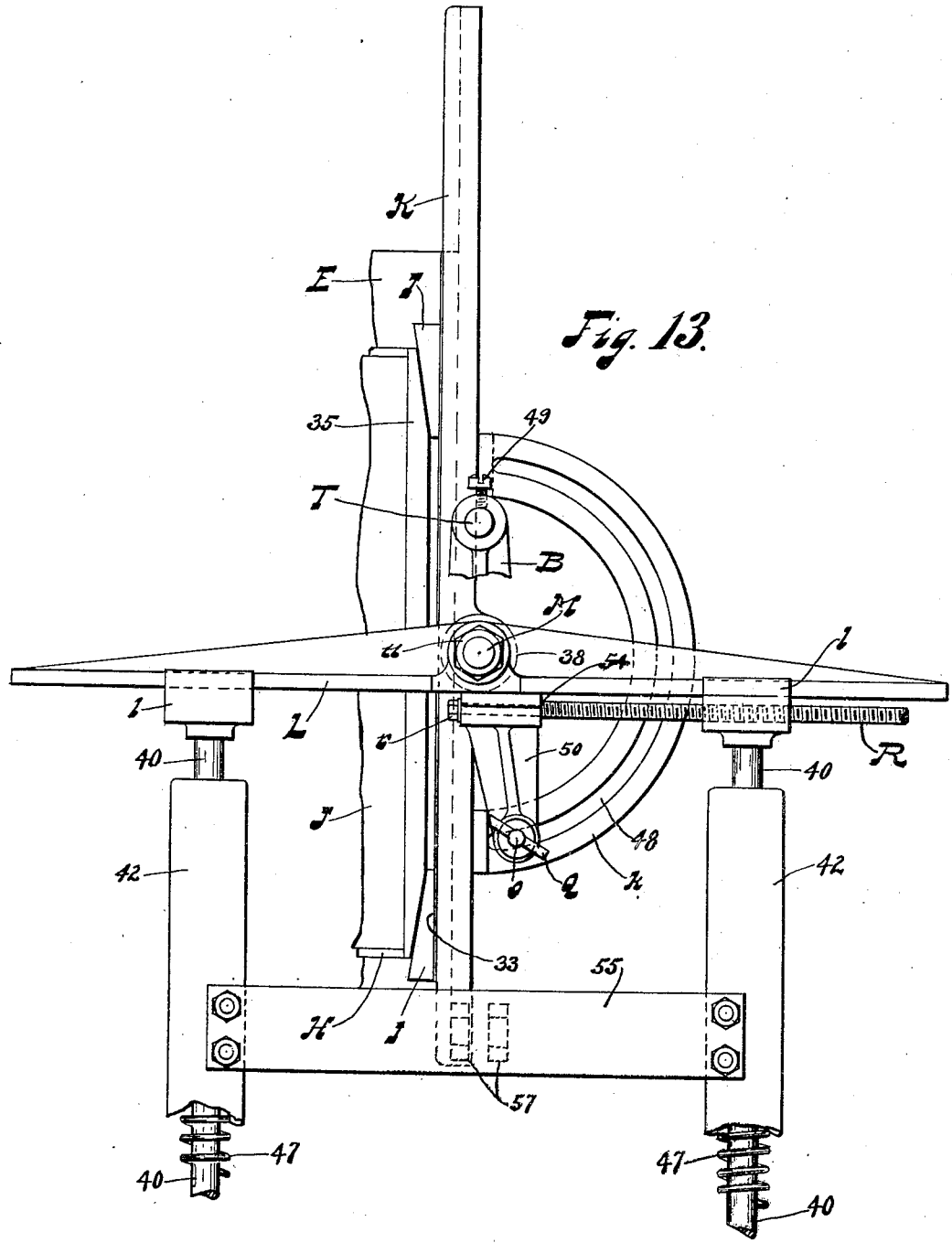

H. F. WHEDON.
ENGRAVING MACHINE.
APPLICATION FILED OCT. 15, 1906.
962,686.
Patented June 28, 1910.
10 SHEETS—SHEET 6.
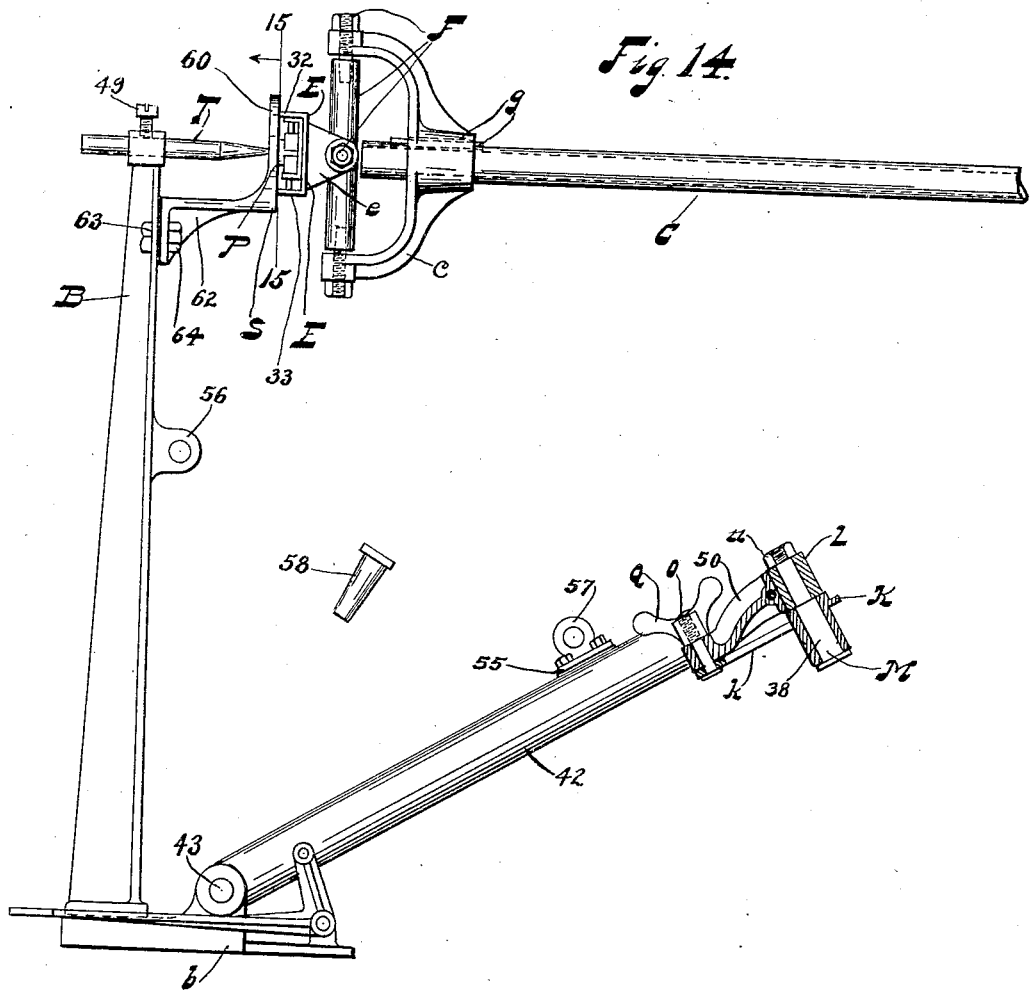
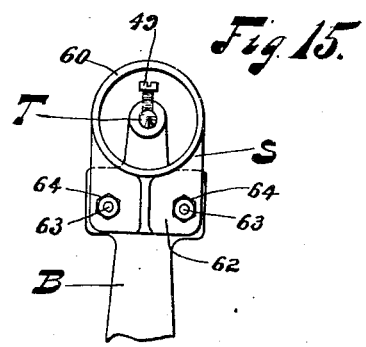

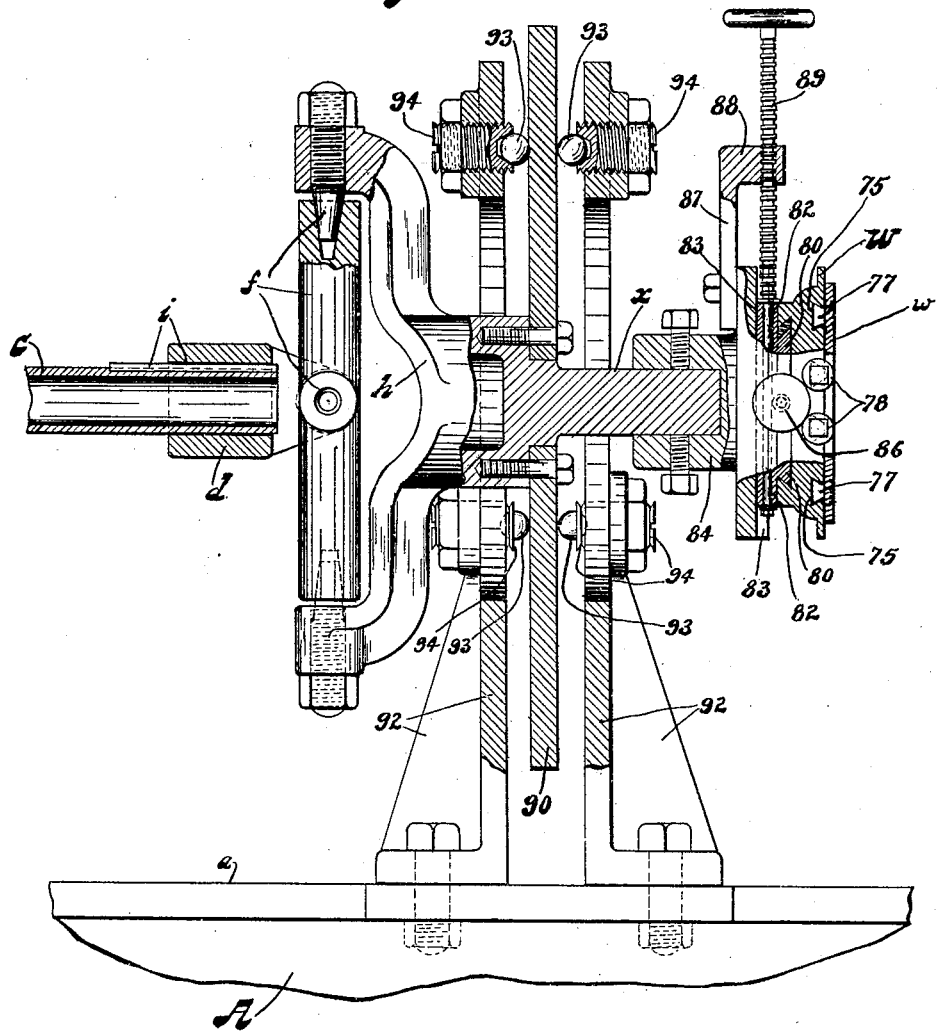

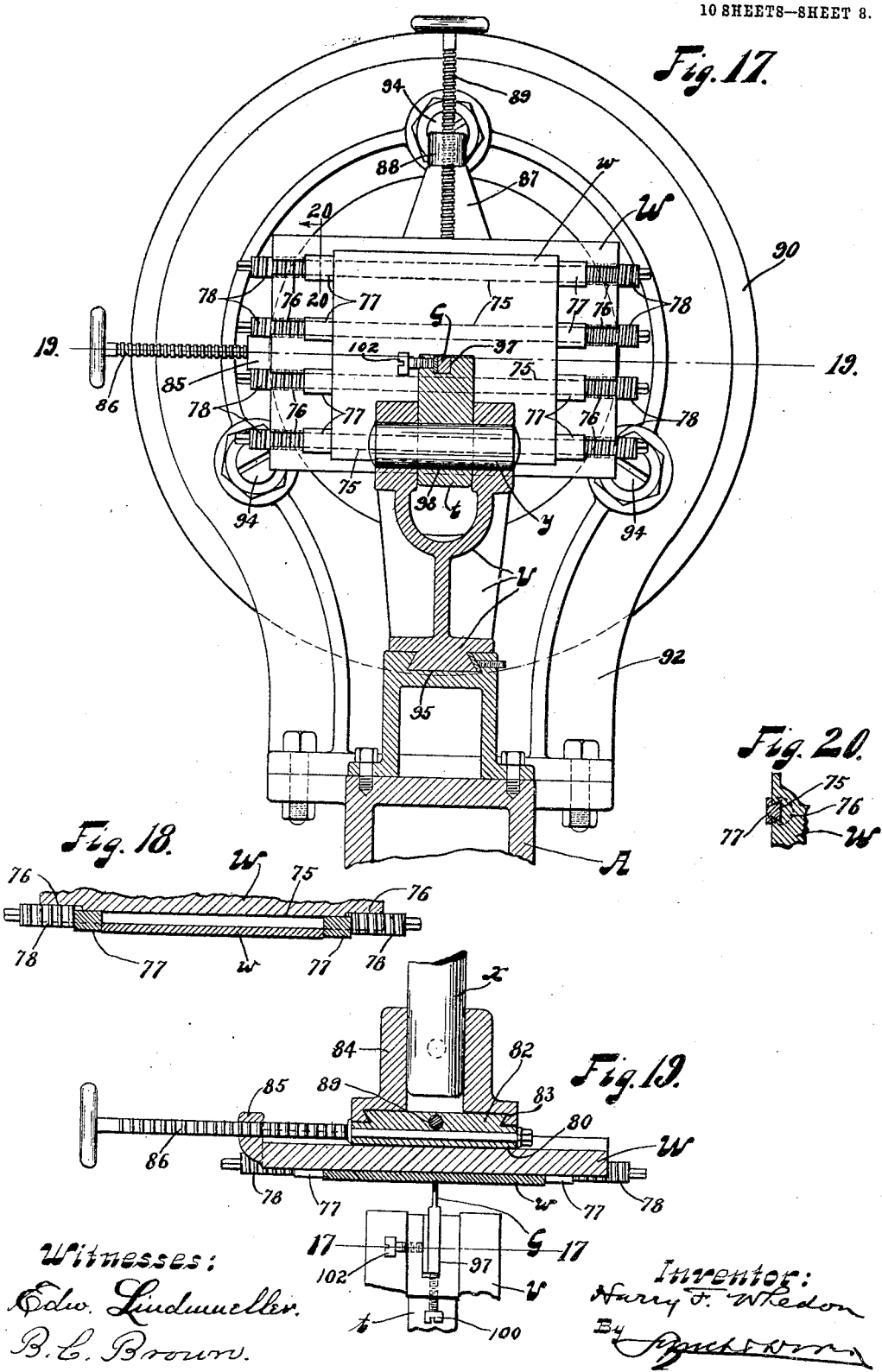

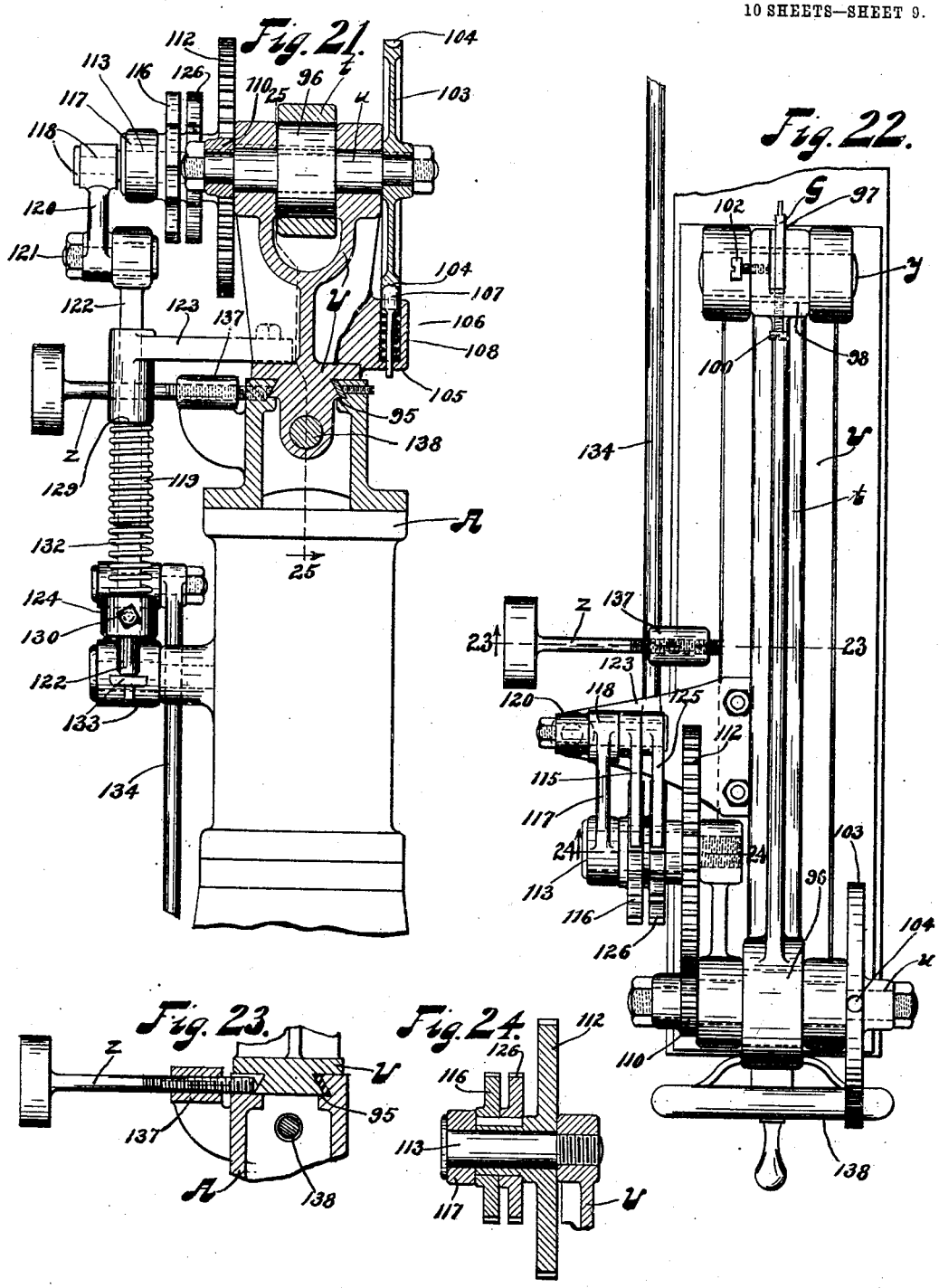

H. F. WHEDON.
ENGRAVING MACHINE.
APPLICATION FILED OCT. 15, 1906.
962,686.
Patented June 28, 1910.
10 SHEETS—SHEET 10.
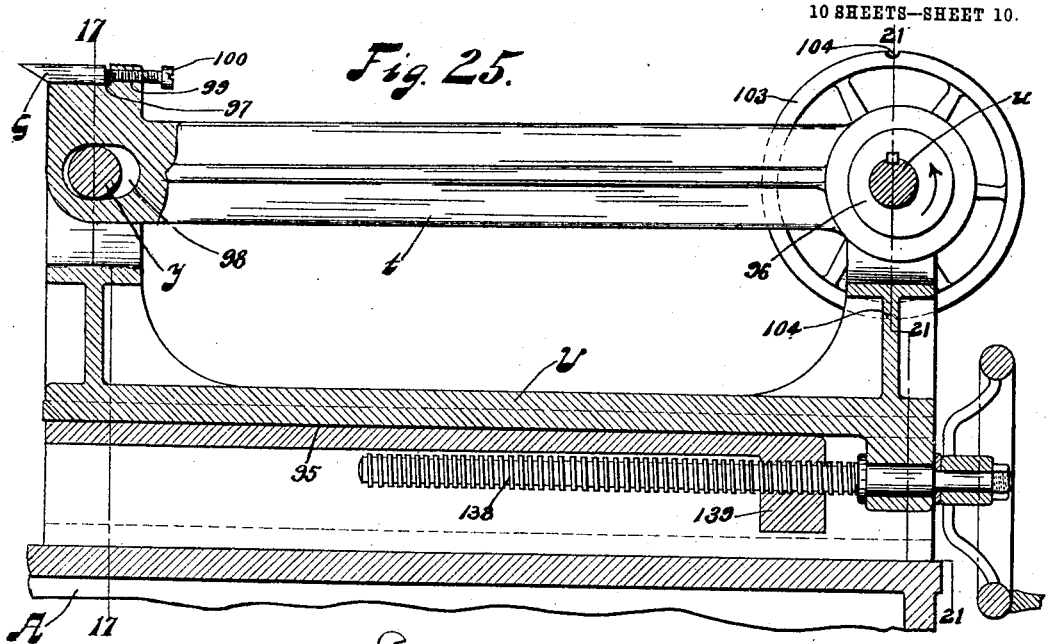
Fig. 25.
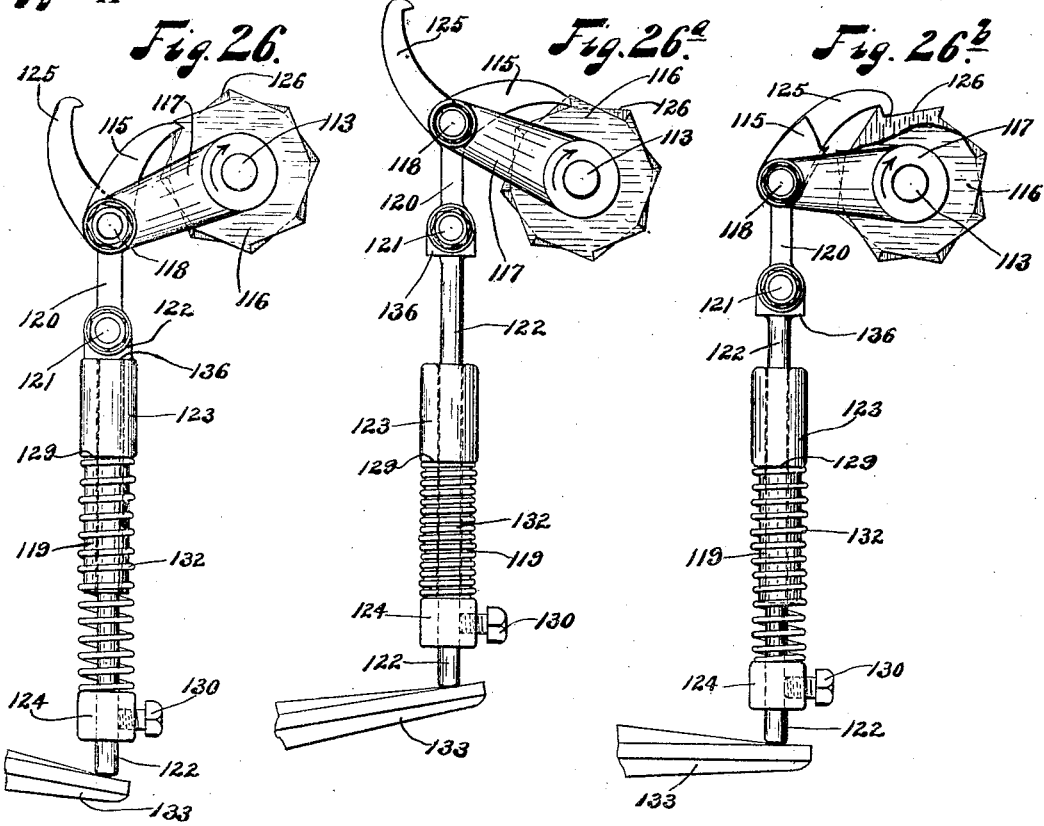
Fig. 26.  Fig. 26.ª  Fig. 26.ᵇ
Witnesses:
Edw. Lindmueller.
B. C. Brown.
Inventor:
Harry F. Whedon
By Synnestvedt
His Attorneys

UNITED STATES PATENT OFFICE.

HARRY F. WHEDON, OF CLEVELAND, OHIO.

ENGRAVING-MACHINE.

962,686.　　　　Specification of Letters Patent.　　Patented June 28, 1910.

Application filed October 15, 1906. Serial No. 339,017.

*To all whom it may concern:*

Be it known that I, HARRY F. WHEDON, a citizen of the United States of America, residing at Cleveland, in the county of Cuyahoga and State of Ohio, have invented certain new and useful Improvements in Engraving-Machines; and I hereby declare the following to be a full, clear, and exact description of the invention, such as will enable others skilled in the art to which it pertains to make and use the same.

This invention relates to improvements in engraving machines, and pertains more especially to an engraving machine in which the plate to be engraved or work-blank is movable relative to a suitably supported graver and is actuated by mechanical means operated by the movement of a pattern relative to a relatively stationary tracer employed in tracing the pattern.

The primary object of this invention is to produce a simple, durable, convenient and accurately and reliably operating engraving machine of the character indicated.

With this object in view, and to the end of realizing other advantages hereinafter appearing, this invention consists in certain features of construction, and combinations of parts, hereinafter described and pointed out in the claims.

In the accompanying drawings, Figure 1 is a side view of the central and rear portion of my improved engraving machine. Portions are broken away and in section in this figure to more clearly show the construction. Fig. 2 is a side view of the forward portion of the machine. Figs. 1 and 2 are drawn on the same scale. Fig. 3 is a vertical section on line 3—3, Fig. 1, looking in the direction indicated by the arrow. Fig. 3 is drawn on a larger scale than Fig. 1. Fig. 4 is a front view of the forward portion of the machine,—that is, a left-hand view relative to Fig. 2. Portions are broken away and in section in Fig. 4 to more clearly show the construction. This figure is drawn on a larger scale than Figs. 1 and 2. Fig. 5 is a vertical section on line 5—5, Fig. 4, looking in the direction indicated by the arrow. Figs. 6, 6ª, 6ᵇ and 6ᶜ are exaggeratively enlarged sections illustrative of the operation of the graver on the work-blank. Fig. 7 is a front side view of the upper part of the forward portion of my improved machine, showing the guide for the pattern-holder in a horizontal position, and illustrating also the means for adjusting the said guide circumferentially of the pivotal bolt which forms the pivotal connection between the said guide and an adjustable and depressible slide. Portions are broken away in this figure to reduce the size of the same and to more clearly show the construction. Fig. 8 is a top plan relative to Fig. 7, except that in Fig. 8 the pattern-holder, tracer and tracer-bearing standard are omitted. Fig. 9 is a vertical section on line 9—9, Fig. 7, looking in the direction indicated by the arrow. Fig. 10 is a vertical section on line 10—10, Fig. 7, looking in the direction indicated by the arrow. Fig. 11 is a horizontal section on line 11—11, Fig. 4, looking downwardly. Fig. 12 is a front view largely corresponding with Fig. 7, except that in Fig. 12 the pattern-holder and guide for the pattern-holder are shown swung into a position at a right angle to their position illustrated in Fig. 7 and adjusted as required to bring the pattern-holder in proper position relative to the tracer. Fig. 13 is a front side view showing, among other things, the pattern-holder and guide for the pattern-holder swung from the position illustrated in Fig. 7 into a position at a right angle to the position illustrated in Fig. 7, but before the pattern-holder has been readjusted relative to the tracer as shown in Fig. 12. Fig. 13 shows the pattern-holder in position ready to be shifted horizontally and thereby adjusted relative to the tracer, whereas Fig. 12 shows the pattern-holder properly adjusted relative to the tracer. Figs. 7, 8, 9, 10, 11, 12 and 13 are drawn on the same scale but on a larger scale than Fig. 3. Fig. 14 is a side view of the forward portion of the machine showing the pattern-holder-guide illustrated in the preceding figures swung rearwardly and out of the way to accommodate the application of a guide employed in guiding the pattern-holder in tracing circles or curved lines of the pattern. Fig. 15 is an elevation taken on line 15—15, Fig. 14, looking in the direction indicated by the arrow. Fig. 16 is a side elevation, largely in section, illustrating, among other things, the axle which bears the work-blank-holder, the operative connection between the axle and the shaft-forming lever instrumental in transmitting motion to the work-blank-holder, and the means whereby horizontality in the axle is maintained during the actuation of the lever. Fig. 17 is a vertical section on line 17—17, Figs. 1, 19 and 25 looking forwardly. Fig. 18 is a horizontal section illustrative of the means employed in securing the work-blank to the work-blank-holder. Fig. 19 is a horizontal section on line 19—19, Fig. 17, looking downwardly. Fig. 20 is a section in detail on line 20—20, Fig. 17, looking outwardly. Fig. 21 is a rear end view of the rear portion of the machine, largely in section on line 21—21, Figs. 1 and 25 looking forwardly. Fig. 22 is a top plan relative to Fig. 21. Fig. 23 is a vertical section on line 23—23, Fig. 22, looking in the direction indicated by the arrow. Fig. 24 is a vertical section on line 24—24, Fig. 22, looking in the direction indicated by the arrow. Fig. 25 is a vertical section on line 25—25, Fig. 21, looking in the direction indicated by the arrow. Figs. 26, 26$^a$ and 26$^b$ are side elevations showing the ratchet-wheel-actuating means of the mechanism employed in shifting the graver into and out of the work-blank to be engraved. Figures from 16 to 26 inclusive are drawn on the same scale but on a considerably larger scale than Fig. 1.

Referring to Fig. 1 of the drawings, A indicates stationary frame-work which comprises a horizontally arranged table or bed $a$. A graver G is arranged above the rear portion of and supported from the bed $a$. A suitably supported work-blank $w$ which is to be engraved is arranged opposite to the forward or engraving end and in position to be operated upon and movable relative to the graver G. B (see Fig. 2) represents a standard arranged a suitable distance forwardly of the forward end of the bed $a$, and T, a tracing tool or tracer supported from the upper end of the standard B. P indicates a suitably supported pattern which is movable relative to and arranged opposite the tracing end of and in position to be traced by the tracer T. The pattern P and work-blank $w$ are movable relative to the tracer T and graver G, respectively, during the engraving operation. The tracer and graver extend forwardly and rearwardly of the machine, are arranged in a horizontal plane, and point or face toward each other.

Two holders which bear the pattern P and work-blank $w$ respectively are provided, and mechanical means for transmitting motion from the pattern-holder to the work-blank-holder are provided and comprise (see Figs. 1 and 2) a bar C which is arranged a suitable distance above and longitudinally of the bed $a$ and extends between and into suitable proximity to the pattern-holder and work-blank-holder. The bar C (see Figs. 1 and 3) is provided at any suitable point between its ends with a spherical collar 30 which is journaled in the upper end of a standard D which is suitably secured to the bed $a$. That is, the bar C is mounted or fulcrumed in the standard D in such a manner that the bar can be swung vertically and laterally a limited distance in any direction and rotated or turned in either direction. The collar 30 is secured to the bar C by a suitably applied set-screw 31. The pattern-holder (see Figs. 2 and 4) is arranged in a vertical plane at a right angle to and opposite the tracer T and preferably comprises a plate E which is arranged vertically and at a right angle to the tracer and operatively connected with the forward end of the bar C through the medium of a universal joint F of any suitable construction; but preferably this joint is interposed and forms a connection between a bracket or arm $e$, with which the plate E is provided, and a bracket $c$ which is slidably but operatively mounted on the bar C. The bracket $c$ is shown operatively connected with the bar C (see Figs. 2 and 14) by the well known means of groove-and-feather, as at $g$, with the latter arranged longitudinally of the lever. Obviously the pattern must be kept in contact with the tracer in any position of the bar C during the manipulation of the said bar, and evident therefore is the importance of such a connection between the joint F and the said bar (the bracket $c$ slidable of as well as operatively connected with the lever) that operative connection between the pattern-holder and the bar cannot be interrupted in swinging the said bar during the maintenance of the pattern-holder in the position required relative to the tracer. The work-blank-holder (see Figs. 1, 17 and 19) is arranged forward of and opposite the graver G and preferably comprises a slide W which is guided in any approved manner and (see Figs. 1 and 16) operatively connected through the medium of a suitably constructed universal joint $f$ with the rear end of the bar C. The joint $f$ is interposed and forms a connection between a bracket $d$, which is slidably but operatively mounted on the bar C, and a bracket $h$ which is formed on an axle $x$ which bears the work-blank-holder. The bracket $d$ is shown operatively connected with the bar C (see Figs. 1 and 16) by the well known means of groove-and-feather, as at $i$, with the latter arranged longitudinally of the bar. The arrangement of the parts is therefore such that the engraving made upon the work-blank $w$ during the operation of the machine is a true reverse copy of the pattern P and that the copy or reproduction of the pattern on the work-blank is increased or decreased in size according as the standard D is adjusted from or toward the work-blank.

The plate E of the pattern-holder (see

Figs. 2, 5 and 12) is rectangular and provided with two forwardly projecting longitudinally arranged flanges 32 and 33 spaced widthwise of the plate. The pattern-holder also comprises a rectangular plate H which is arranged at and contiguous to the forward side and longitudinally of the plate E. The plate H is provided with two forwardly projecting flanges 34 and 35 spaced widthwise of the plate. The flange 34 abuts against and extends longitudinally of the inner side of the flange 32 of the plate E. The flange 35 of the plate H is arranged a suitable distance from and extends longitudinally of the flange 33 of the plate E. Wedges I are interposed between the flange 35 of the plate H and the flange 33 of the plate E. Between the flanges 34 and 35 of the plate H are arranged two parallel bars J which are spaced between and extend longitudinally of the said flanges. The pattern to be traced is arranged at the forward side of the bars J, overlapping the forward or outer sides of the said bars and composed of sections, with each section provided at its rear side with a rearwardly projecting flange 36 (see Fig. 5) interposed between the two bars. The flange 34 of the plate H is wedge-shaped and gradually reduced in thickness vertically toward one end of the flange, and a wedge 37 is interposed between the said flange and the adjacent bar J. It will be observed therefore that the pattern-sections are held in place by the bars J, and that the said bars and pattern-sections are tightened relative to the flanges 34 and 35 of the plate H upon driving and thereby tightening the wedges I and 37.

A guide for guiding the pattern-holder during the movement of the pattern-holder so as to maintain the pattern-holder perpendicular and at a right angle to the tracer is provided and preferably comprises an angle-bar K. In tracing straight lines of the pattern (see Figs. 2, 4, 7, 8, 9 and 10) the bar K during its operation, (as shown in Figs. 2, and 7) has the inner side of one of its wings engaged by the outer side of the flange 33 of the plate E of the pattern-holder and has the inner side of the other of its wings engaged by the longitudinal free edge of the said flange. The angle-bar K is provided, centrally between its ends and at the outer side of its wing which engages the outer side of the flange 33 of the plate E of the pattern-holder, with a lug 38 and is pivoted at the said lug to a laterally movable slide L which is arranged horizontally and forward of the bar K. The pivotal connection between the bar K and the slide L preferably comprises a pivotal bolt M which (see Fig. 10) extends through the slide L and bar K and is arranged horizontally and at a right angle to or transversely of the travel of the slide. The bolt M is arranged with its head abutting against the rear end of the lug 38, and a correspondingly screw-threaded nut $n$ is mounted on the shank of the bolt at the forward longitudinal edge of the slide L. The bar K is obviously clamped to the slide L by tightening the nut $n$. The slide L is depressible as will hereinafter appear and in tracing a straight line of the pattern the slide is depressed to bring the lower extremity of the line opposite the tracer and then the line is traced from the said extremity to the upper end of the line.

The slide L (see Figs. 4, 7, 8 and 9) has bearing in correspondingly arranged slideway-forming members $l$ which are spaced laterally of the machine. The slideway-forming members $l$ are consequently spaced longitudinally of the slide L and are arranged at opposite sides respectively of the pivotal connection between the guide-bar K and the slide. Each slideway-member $l$ (see Fig. 4) is provided with a depending vertically arranged stem 40 which is surrounded by a correspondingly arranged upright guide-tube 42 which extends from a point a suitable distance below the upper end of the stem downwardly to a point a suitable distance below the lower end of the stem and is pivoted at its lower end, as at 43, to a horizontally arranged stationary base $b$ to which the standard B is rigidly secured, with the pivotal connection between the said guide-tube and the base arranged with its axis parallel with the travel of the slide L. Preferably each stem 40 has lateral bearing in the upper end of the embracing guide-tube 42 and has lateral bearing at or near its lower end in a bushing 44 which is externally screw-threaded and screwed into the correspondingly screw-threaded lower end-portion of the said guide-tube, and fixed to the tube by a suitably applied set-screw 45. Each stem 40 (see Fig. 4) is provided within the upper end of the stem-embracing tube 42 with a collar 46, and a spiral spring 47 is confined within the said tube between the said collar and the upper end of the bushing 44 which embraces the lower portion of the said stem. It will be observed therefore that the two depressible slideway-forming members $l$ not only afford bearing to the slide at opposite sides respectively of the pivotal connection between the guide-bar K and the slide, but that the tubes 42 form upright guides for the depending stems 40 of the said slide-forming members and that the springs 47 constitute means acting to retain the said slideway-forming members in their upper and normal position wherein the stems are far enough above the embracing guide-tubes and are arranged far enough above the pivotal connections between the said tubes and the base $b$ to accommodate the maximum depression which may be required of the slide. The means for securing the guide-bar K in the desired adjustment comprises (see Figs. 4, 7 and 10) a slotted segment k which is rigid with the said bar and arranged concentrically of the pivotal bolt M and rearwardly of the slide L, and the said slide is provided centrally between its ends with a depending arm 50 which affords bearing to a bolt O which extends through the slot 48 in the segment k and through the lower end of the said arm. The bolt O is arranged with its head at the rear side of the segment and bears a correspondingly screw-threaded thumb-nut Q which is mounted on the shank of the bolt at the forward side of the arm.

It will be observed that in tracing vertical straight lines of the pattern the guide-bar K is arranged horizontally, as shown in Figs. 2, 4, 7, 8, 9 and 10; that in tracing the horizontal straight lines of the pattern the bar K is readjusted as required to bring it into a vertical position, as shown in Figs. 12 and 13, and that in tracing straight oblique lines of the pattern the said bar is readjusted to bring it into an oblique position (not shown). The relative arrangement of the parts is preferably such that when the pattern-holder is held with the bar C parallel with the pivotal bolt M, as shown in Fig. 2, the tracer T is central relative to the pattern-holder, as shown in Fig. 4. When, however, the pattern-holder and the pattern-guide K are swung from the position shown in Figs. 4, 7 and 8 into the position shown in Fig. 13 the pattern-holder is brought into a position to one side of the tracer T, as shown in Fig. 13, and obviously the pattern-guide K when in the perpendicular position illustrated in Fig. 13 has to be shifted laterally to the extent required to bring the pattern-holder opposite and central relative to the tracer T, as shown in Fig. 12. The means for shifting the pattern-guide K laterally as required to accommodate the movement of the pattern-holder from the position shown in Fig. 13 into the position shown in Fig. 12, comprise the slide L and means for shifting the said slide horizontally and laterally at a right angle to the pivotal bolt M. The means for shifting the slide preferably comprise (see Figs. 4, 7, 10, 12 and 13) a screw R which is arranged horizontally and parallel with the travel of the slide L and extends through one of the slideway-forming members l, engaging a correspondingly screw-threaded hole 52 formed in the said slideway-forming member (see Figs. 7 and 9), and the said screw extends loosely (see Figs. 7 and 10) through a correspondingly arranged hole 53 formed in the upper end of the slide-arm 50, with the said screw provided with a shoulder 54 exteriorly of and next the said arm at one end of the said hole 53, and a nut r is screwed on the said screw exteriorly of the arm 50 at the opposite end of the said hole. It will be observed therefore that the screw R is attached to the slide-arm 50 without interfering with the rotation of the screw and that the slide L is shifted horizontally and laterally in the one direction or the other according as the screw R is turned in the one or the other direction.

The tracer T, as already indicated, is supported from the upper end of a standard B which is rigid with the base b. Preferably the tracer extends through a correspondingly arranged hole formed in the upper end of the said standard and is adjustable endwise and secured in the desired adjustment by a suitably applied set-screw 49.

The two guide-forming tubes 42 are (see Figs. 4, 11, and 13) connected together by a cross-bar 55 which is suitably secured to the said tubes and not only ties the said tubes together but forms a brace between them. The tubes 42 are in their upright position removably attached to the standard B which is preferably provided at its rear side with a rearwardly projecting ear 56 arranged between two forwardly projecting ears 57 formed on the cross-bar, and a pin 58 extends through and snugly engages but is withdrawable from the ears 56 and 57 (see Fig. 11). It will be observed therefore that upon removing the pin 58 as shown in Fig. 14 the guide tubes 42 and connected slideway-forming members l, slide L and pattern-guide K are free to be swung rearwardly out of the way to accommodate the application of a guide S instrumental in maintaining verticality of the forward side of the pattern in tracing circles or curves of the pattern.

The guide S (see Figs. 14 and 15) preferably comprises an upright annular member 60 which is adapted to extend around the tracing point of the tracer and has a rearwardly facing vertically arranged flat surface adapted to be engaged by the forward edges of the flanges 32 and 33 of the plate E of the pattern-holder, which flanges project forwardly far enough to accommodate the engagement therewith of the said annular member 60 of the said guide without interfering with the location of the pattern. The guide member 60 is rigid at the bottom with a bracket or arm 62 shown removably secured by suitably applied bolts 63 and nuts 64 to the standard B.

The standard D (see Figs. 1 and 3) is adjustable longitudinally of the table or bed a,—that is,—forwardly and rearwardly between the work-blank-holder and the pattern-holder, and obviously the engraving made on a work-blank held by the work-blank-holder is larger or smaller according as the standard D and consequently the fulcrum of the bar C is located farther from or nearer to the work-blank-holder. The standard D is provided at its lower end with horizontally arranged flanges 66 which rest upon the bed $a$. The bed $a$ is provided with laterally spaced recesses 67 arranged below the flanges 66 and extending longitudinally of the bed $a$, which recesses have their lower portions enlarged laterally, as at 68. The means for securing the standard D in the desired adjustment comprise bolts 70 and nuts 72. The bolts 70 extend through the flanges 66 into the recesses 67 and are arranged with their heads engaging the lateral enlargements 68 of the said recesses, and the nuts 72 are mounted on the shanks of the said bolts at the upper sides of the flanges 66. Obviously the standard D is rendered free to be readjusted upon loosening the nuts 72 and is secured in the desired adjustment by tightening the said nuts. The standard D to prevent lateral displacement thereof during a readjustment of the same is provided at its lower end with a depending tongue 73 which engages a recess 74 formed in the bed $a$ and arranged parallel with the recesses 67. The recesses 67 and 74 are of course long enough to accommodate the range of adjustment of the standard D.

The slide W (see Figs. 16, 17, 18, 19 and 20) has an outer vertcially arranged face which is provided with vertically spaced parallel undercut recesses 75 which are arranged horizontally and extend transversely of the said slide. Each recess 75 terminates at each end in a screw-threaded hole 76 which extends to the adjacent side edge of the slide and is arranged in line with the said recess. The work-blank $w$ abuts against the outer vertically arranged face of the slide W and is clamped at its side edges by two spacing blocks 77 which engage the recesses 75. Each block 77 (see Fig. 20) has an undercut portion slidably fitting the engaging undercut recess 75. The blocks 77 are clamped against the work-blank by screws 78 which are screwed into the correspondingly threaded holes 76 leading to the said recesses, which holes are of course enough larger than the said recesses to accommodate the application of the spacing blocks preparatory to the application of the screws. The removability of the spacing blocks is important to accommodate the substitution of larger or smaller blocks as required in substituting a larger or smaller work-blank. The slide W constitutes a portion of the work-blank-holder as already indicated, and it will be observed therefore that the means employed for securing the work-blank in place comprise the screws 78 which are screwed into the work-blank-holder and perform the function of clamping the spacing blocks against the side edges of the work-blank.

It is desirable to have the work-blank adjustable vertically and laterally relative to the graver, and evident therefore is the importance of having the work-blank-holder comprising a horizontally movable slide W which (see Fig. 16) engages a slideway-forming member 80 which is integral with a vertically movable slide 82 which engages a correspondingly arranged slideway 83 formed in the outer end of a collar 84 which is mounted on and secured to the axle $x$ which is arranged horizontally as already indicated and extends forwardly and rearwardly between the work-blank-holder and the universal joint $f$. It will be observed therefore that the slide W is borne by the vertically shiftable slide 82 and that the work-blank is shifted vertically relative to the graver by actuating the last-mentioned slide, and that the work-blank is shifted horizontally and laterally relative to the graver by actuating the slide W. The slide W is actuated in any approved manner. For instance the slide W (see Fig. 19) is provided at one end with a nut-forming member 85 provided interiorly with a screw-threaded hole which is parallel with the travel of the slide and engaged by a correspondingly arranged and correspondingly threaded screw 86 which is attached to the slide 82 is such a manner that it can turn within the last-mentioned slide, and obviously the slide W is shiftable horizontally in the one direction or the other according as the screw 86 is turned in the one or the other direction. The collar 84 (see Fig. 16) is provided with a bracket 87 which has a nut-forming member 88 arranged a suitable distance above and overhanging the vertically shiftable slide 82, which nut-forming member is provided with a vertically arranged screw-threaded hole engaged by a correspondingly arranged and correspondingly threaded screw 89 which is attached to the said slide in such a manner that the screw can turn in the slide, and obviously the said slide is raised or lowered according as the screw is turned in the one direction or the other.

A disk 90 which is arranged vertically and consequently parallel with the work-blank (see Fig. 16) is operatively mounted on and secured to the axle $x$ between the collar 84 and the bracket $h$, and means whereby verticality of the disk and consequently of the work-blank is maintained during the actuation of the shaft is provided and comprise preferably two stationary frames 92 and 92 which extend around and a suitable distance from the axle at opposite sides respectively of the disk and are rigidly secured in any approved manner to the bed $a$. Antifriction balls 93 are interposed between the inner side of each frame 92 and the disk 90, which balls are spaced circumferentially of the axle $x$ and partially borne and embraced by the inner ends of the screw 94 which are screwed into the said frame. It will be observed that the antifriction bearings 93 prevent displacement of the disk 90 and consequently of the axle $x$ so that the work-blank-holder is effectually prevented from displacement toward or from the graver G.

It will be observed that the connection of the universal joint $f$ with the bar C through the medium of a bracket $d$ which is slidably as well as operatively mounted on the bar is important to avoid interruption in the operative connection between the work-blank-holder and the bar during the swinging of the bar to move the disk 90 and consequently the work-blank-holder vertically or laterally.

A slide U (see Figs. 1, 21, 23 and 25) is mounted on the stationary frame-work A rearwardly of the work-blank-holder. The slide U is movable in a horizontal plane forwardly toward and rearwardly from the work-blank-holder and engages a correspondingly arranged slideway 95 with which the stationary frame-work is provided. A shaft $u$ is carried by the rear end of the slide U and is arranged horizontally and transversely of the said slide. An eccentric 96 is operatively mounted on the shaft $u$ centrally between the ends of the shaft, and a bar $t$ which is arranged longitudinally of the slide at one end embraces the eccentric and is provided at its other end and at the top with a recess 97 which is arranged longitudinally of the bar and engaged by the graver G, which recess is open therefore at its forward end at the forward end of the bar. The bar or graver-carrier $t$ is provided in the forward end below and rearwardly of the forward or cutting end of the graver with a lateral slot 98 which extends longitudinally of the said end of the bar a suitable distance. A pin $y$ which is arranged horizontally and parallel with the shaft $u$ engages the slot 98. The pin $y$ affords bearing and is stationary relative to the graver-carrier formed by the bar $t$. In the inoperative position of the graver the shaft $u$ is arranged with the belly of the eccentric at the rear side of the shaft, as shown in Fig. 25, and the graver is rendered operative by actuating the shaft in the direction indicated by the arrow placed on the eccentric in the said figure because as the pattern-holder in tracing straight lines of the pattern is moved upwardly the work-blank in engraving a corresponding line thereon by the graver is moved downwardly. The graver being borne by the eccentric-actuated bar or carrier $t$ is during the actuation of the said carrier in the direction required to render the graver operative or inoperative caused to move in a curved line instead of in a straight line. The forwardly facing rear wall of the recess 97 in the graver-carrier is (see Fig. 25) provided with a screw-threaded hole 99 which extends through the said wall and is engaged by a correspondingly threaded screw 100 which engages the rear end of the graver which is therefore adjustable endwise, and the graver is secured in the desired adjustment (see Fig. 17) by a suitably applied set-screw 102 which is screwed into and through one of the side walls of the recess 97.

Means instrumental in preventing any oscillation of the shaft $u$ during the operation of the graver is provided (see Fig. 21) and comprise preferably a wheel 103 which is operatively mounted on the shaft and provided with two segmentally spherical recesses 104 formed in the periphery of the wheel at diametrically opposite points respectively. The shaft-bearing slide U (see Fig. 1) is provided in under the wheel 103 with a lug 105 which has a recess 106 extending downwardly from the top of the lug and engaged by the head-forming upper end of a bolt 107. The upper portion of the head-forming end of the bolt 107 is segmentally spherical to render it capable of snugly engaging one of the segmentally spherical recesses 104, and a spiral spring 108 is confined within the recess 106 and engages the head-forming portion of the bolt from below and acts to retain the bolt in its upper and operative position. The arrangement of the parts is such that the bolt engages the one or the other of the recesses 104 in the wheel 103 according as the graver-bearing bar or carrier is in position holding the graver in an operative or inoperative position. The segmentally spherical contour of the upper end of the bolt and the corresponding contour of the walls of the recesses 104 render the bolt readily depressible by the turning of the wheel 103 during the operation of the shaft by the mechanism employed in turning the shaft. The wheel 103 is mounted on one end of the shaft $u$, and a pinion 110 is operatively mounted on the other end of the said shaft. The pinion 110 constitutes a member of the mechanism employed in operating the shaft $u$ and is in mesh with a spur-gear 112 which is loosely mounted on an axle 113 which (see Figs. 22 and 24) is arranged forward of and parallel with the shaft and supported from the slide U in any approved manner. Two corresponding but reversely arranged ratchet-wheels 116 and 126 (see Figs. 22 and 24) are operatively mounted on the hub of the gear 112 and two suitably applied pawls 115 and 125 are adapted to actuate the different ratchet-wheels respectively but in opposite directions respectively, and obviously the gear 112 and consequently the shaft $u$ are rotated in the one direction or the other according as power is applied to the one or the other of the ratchet-wheels. An arm 117 (see Figs. 22 and 26) is loosely mounted on and projects forwardly from the axle 113. An axle 118 has bearing in the outer end of the arm 117 and is arranged parallel with the axle 113 and shaft $u$, and the pawls 115 and 125 are loosely mounted on the axle 118. An upright link 120 is loosely mounted on and depends from the axle 118 and is pivoted at its lower end, as at 121, parallelly with the said axle to the upper end of a vertically arranged rod 122 which (see Fig. 21) has lateral bearing in a bracket 123 which is rigid with the slide U. The rod 122 (see Figs. 21 and 26) is provided a suitable distance below the bracket 123 with a collar 124 which is secured to the said rod by a suitably applied set-screw 130. The bracket 123 is provided with a depending lug 119 which extends around and participates in the lateral bearing which the bracket affords to the rod 122. The bracket is provided with a shoulder 129 at the upper end of the member 119, and a spiral spring 132 is coiled around the rod 122 and bracket-member 119 and confined between the collar 124 and the shoulder 129 and acts to retain the rod in its lower and normal position. The rod is engaged at its lower end (see also Fig. 1) below the collar 124 by lever-mechanism employed in actuating the said rod upwardly against the action of the spring 132. The said lever-mechanism (see Figs. 1 and 2) comprises a bell-crank 133 supported from the stationary frame-work A in suitable proximity to the rod 122 and arranged with one of its arms extending in under the rod. The other arm of the said bell-crank is operatively connected by a rod 134 with one arm of a bell-crank 135 which is suitably supported from the base $b$ and is arranged to be operated by the foot of the operator. The lower end of the lug or bracket-member 119 coöperates with the collar 124 in forming a stop limiting the upward movement of the rod 122, and the said rod is provided above the bracket 123 with a downwardly facing shoulder 136 which rests upon the said bracket in the lower and normal position of the rod and coöperates with the bracket in forming a stop for limiting the descent of the rod. The pawl 125 is normally swung away from the ratchet-wheel 126 and consequently in an inoperative position. The pawl 115 is normally in an operative position, engaging the ratchet-wheel 116. The parts are so arranged and timed that upon actuating the rod 122 upwardly against the action of the spring 132 by the operation of the engaging rod-actuating lever-mechanism the shaft $u$ is given a half turn so as to cause the graver of the graver-carrier to enter the work-blank the required distance.

The work-blank is only entered by the graver a small fraction of an inch, and the depth of groove 140 cut in the work is shown greatly exaggerated in Figs. 6, 6$^a$, 6$^b$ and 6$^c$ for the sake of clearness. Fig. 6 illustrates a work-blank as having begun its descent, with the graver in position having entered the blank. Fig. 6$^a$ shows a lowered work-blank, with the graver in position just withdrawn from the groove cut thereby in the blank. It will be observed that the graver during the entering thereof into and its withdrawal from the work-blank describes a curve so as to cause the ends of the groove cut by the graver to be gradually reduced in depth toward the extremities of the groove as shown in Figs. 6 and 6$^a$ and the formation of burs at the ends of the groove are avoided. Sometimes however it is desired to avoid the gradual reduction in depth of the ends of the groove cut by the graver. Then the graver is permitted to remain in its most forward position in the work-blank until the groove has been cut to its upper extremity, as shown in Fig. 6$^b$, whereupon the graver is withdrawn from the blank along the dotted curved line 142 upon throwing the pawl 125 into an operative position as shown in Fig. 26$^b$ and operating the graver-carrier through the medium of the ratchet-wheel 126. A bur 143 will by the operation shown in Fig. 6$^b$ likely have been formed upon the face of the work-blank at the upper end of the groove. When the graver has been withdrawn from the work-blank along the line 142 in Fig. 6$^b$ the work-blank is turned down side up as shown in Fig. 6$^c$ and thereupon the graver is again entered into the work-blank, uniformly deepening the groove's end first cut by the graver and likely forming a bur 144 at the face of the work-blank at the said end of the groove, as shown in Fig. 6$^c$, and then the graver is withdrawn from the work-blank along the dotted curved line 145 by again operating the pawl 125 and the ratchet-wheel 126. The burs 143 and 144 are readily removed by the application of a brush or other suitable means.

The means for shifting the slide U (see Fig. 25) comprise a screw 138 which is operatively attached to the slide in such a manner as to be turnable in the slide. The screw 138 is arranged longitudinally of the slide and extends through a correspondingly threaded hole formed in a nut-forming member 139 with which the stationary framework A is provided. Obviously the slide is shifted forwardly or rearwardly according as the screw 138 is turned in the one direction or the other. The slide U is secured in the desired adjustment by a screw $z$ which is arranged at one side of the slide and at a right angle to the travel of the slide. The screw $z$ (see Fig. 23) extends into engagement with the adjacent side of the slide through a correspondingly arranged and correspondingly threaded hole formed in a nut-forming member 137 which is rigid with the stationary frame-work and provided at one side of the range of adjustment of the slide.

Briefly described, the manner of using my improved engraving machine is as follows:— The graver G is placed or adjusted into position ready to operate on the work-blank. The pattern P is kept in contact with the tracer T in any position of the bar C during the manipulation of the said bar in transmitting motion from the pattern-holder to the work-blank-holder. The standard D is adjusted toward or from the work-blank according as a smaller or larger copy or reproduction of the pattern upon the work-blank is to be obtained. To trace a vertical straight line of the pattern the guide-bar K is placed horizontally and the pattern-holder is arranged to bring one extremity of the said line opposite to and into contact with the tracer whereupon the pattern-holder is moved vertically to cause the said line to be traced by the tracer from the said extremity to the other extremity of the said line. To trace a horizontal line of the pattern the bar K is placed vertically and the pattern-holder is arranged to bring one end of the said line opposite to and in contact with the tracer whereupon the pattern-holder is moved vertically to cause the said line to be traced by the tracer from the said end to the other end of the said line. To trace an oblique line of the pattern the bar K is brought into a correspondingly oblique position and the pattern-holder is arranged to bring one extremity of the said line opposite to and in contact with the tracer, whereupon the pattern-holder is shifted along the said bar to cause the said line to be traced by the tracer from the said extremity to the other extremity of the said line. If a circle or curved line of the pattern is to be traced the bar K is swung rearwardly out of the way to permit the application of the guide S and to accommodate the turning of the pattern-holder which is then placed in position to bring the circle or curved line to be traced opposite to and in contact with the tracer whereupon the pattern-holder is rotated or turned or manipulated to cause the said circle or curved line to be traced. The graver is caused to enter the face of the work-blank simultaneously with the beginning of the tracing of any line of the pattern and is withdrawn from the work-blank simultaneously with the finishing of the tracing of said line.

What I claim is:—

1. In an engraving machine, the combination, with a graver, a work-blank-holder arranged opposite to and movable across the engraving extremity of the graver, a tracer, a pattern-holder arranged opposite to and movable across the tracing extremity of the tracer, and means whereby the work-blank-holder is actuated by and during the actuation of the pattern-holder, of a guide for the pattern-holder, which guide is movable to accommodate the shifting of the pattern-holder across the tracing extremity of the tracer.

2. In an engraving machine, the combination, with a graver, a work-blank-holder arranged opposite to and movable across the engraving extremity of the graver, a tracer, a pattern-holder arranged opposite to and movable across the tracing extremity of the tracer, and means whereby the work-blank-holder is actuated by and during the actuation of the pattern-holder, of a guide for the pattern-holder, a depressible slide carrying the guide, a pivotal connection between the guide and the slide and arranged transversely of the slide, and means whereby the guide is secured in the desired adjustment around the said pivotal connection.

3. In an engraving machine, the combination, with a graver, a work-blank-holder arranged opposite to and movable across the engraving extremity of the graver, a tracer, a pattern-holder arranged opposite to and movable across the tracing extremity of the tracer, and means whereby the work-blank-holder is actuated by and during the actuation of the pattern-holder, of a guide for the pattern-holder, a depressible slide carrying the guide, a pivotal connection between the guide and the slide and arranged transversely of the slide, and means normally retaining the slide in its highest position, and means for securing the guide in the desired adjustment around the aforesaid pivotal connection.

4. In an engraving machine, the combination, with a graver, a work-blank-holder arranged opposite to and movable across the engraving extremity of the graver, a tracer, a pattern-holder arranged opposite to and movable across the tracing extremity of the tracer, means whereby the work-blank holder is actuated by and during the actuation of the pattern-holder, of a bar forming a guide for the pattern-holder, which bar is shiftable to accommodate the movement of the pattern-holder across the tracing extremity of the tracer.

5. In an engraving machine, the combination, with a graver, a work-blank-holder arranged opposite to and movable across the engraving extremity of the graver, a tracer, a pattern-holder arranged opposite to and movable across the tracing extremity of the tracer, means whereby the work-blank holder is actuated by and during the actuation of the pattern-holder, of a bar forming a guide for the pattern-holder, a depressible slide carrying the bar, a pivotal connection between the bar and the slide, and means whereby the said bar is secured in the desired adjustment around the said pivotal connection.

6. In an engraving machine, the combination, with a graver, a work-blank-holder arranged opposite to and movable across the engraving extremity of the graver, a tracer, and a pattern-holder arranged opposite to and movable across the tracing extremity of the tracer, and means whereby the work-blank-holder is actuated by and during the actuation of the pattern-holder, of a guide for the pattern-holder, a depressible slide normally in its highest position, a pivotal connection between the guide and the slide and arranged transversely of the line of travel of the slide, means normally retaining the slide in its highest position, and means whereby the guide is secured in the desired adjustment around the aforesaid pivotal connection.

7. In an engraving machine, the combination, with a graver, a work-blank-holder arranged opposite to and movable across the engraving extremity of the graver, a tracer, a pattern-holder arranged opposite to and movable across the tracing extremity of the tracer, and means whereby the work-blank-holder is actuated by and during the actuation of the pattern-holder, of a guide for the pattern-holder, a depressible slide carrying the pattern-holder and movable horizontally and transversely of the tracer, depressible members forming a slideway for the slide, and means normally retaining the said depressible members in their highest position.

8. In an engraving machine, a guide shiftable in two planes arranged at a right angle to each other, which guide is pivotally supported, means whereby the guide is secured in the desired adjustment around its pivotal support, a rotatable pattern-holder shiftable to maintain it in contact with the guide and having its axis arranged parallel with the axis of the aforesaid pivotal support, a tracer arranged to trace the pattern to be held by the pattern-holder, a rotatable work-blank-holder shiftable with the pattern-holder, a graver arranged to operate on the work-blank carried by the work-blank-holder, and means whereby the work-blank-holder is actuated by and during the actuation of the pattern-holder.

9. In an engraving machine, a guide having a range of movement vertically and adjustable laterally relative to its range of movement vertically, which guide is pivotally supported, means whereby the guide is secured in the desired adjustment around its pivotal support, a rotatable pattern-holder shiftable to maintain it in contact with the guide and having its axis arranged parallel with the axis of the aforesaid pivotal support, a tracer arranged to trace the pattern to be held by the pattern-holder, a rotatable work-blank-holder shiftable with the pattern-holder, a graver arranged to operate on the work-blank carried by the work-blank-holder, and means whereby the work-blank-holder is actuated by and during the actuation of the pattern-holder.

10. In an engraving machine, a guide normally adapted to be lowered and adjustable laterally relative to its range of movement vertically, which guide is pivotally supported, means whereby the guide is secured in the desired adjustment around its pivotal support, a rotatable pattern-holder shiftable to maintain it in contact with the guide and having its axis arranged parallel with the axis of the aforesaid pivotal support, a tracer arranged to trace the pattern to be held by the pattern-holder, a rotatable work-blank-holder shiftable with the pattern-holder, a graver arranged to operate on the work-blank carried by the work-blank-holder, and means whereby the work-blank-holder is actuated by and during the actuation of the pattern-holder.

11. In an engraving machine, the combination, with a movable pattern-holder, a tracer arranged to trace the pattern to be held by the pattern-holder, a movable work-blank-holder shiftable with the pattern-holder, a graver arranged to operate on the work-blank carried by the work-blank-holder, and means whereby the work-blank-holder is actuated by and during the actuation of the pattern-holder, of a guide by which the pattern-holder is guided in moving the pattern-holder relative to the tracer in tracing straight lines; a slide arranged forward of the guide; a pivotal connection between the guide and the slide, which pivotal connection is arranged transversely of the line of travel of the slide; a segment rigid with the guide and provided with a slot arranged concentrically of the said pivotal connection; a bolt and nut for clamping the segment to the aforesaid arm, said bolt extending through the slot and through the arm; depressible members forming a slideway for the slide and arranged at opposite sides respectively of the said arm; means for actuating the slide, and means normally acting to retain the said depressible members in their upper position.

12. In an engraving machine, the combination, with a movable pattern-holder, a tracer arranged to trace the pattern to be held by the pattern-holder, a movable work-blank-holder shiftable with the pattern-holder, a graver arranged to operate on the work-blank carried by the work-blank-holder, and means whereby the work-blank-holder is actuated by and during the actuation of the pattern-holder, of a bar forming a guide by which the pattern-holder is guided in moving the pattern-holder relative to the tracer in tracing straight lines; a slide having a depending arm; a pivotal connection between the bar and the slide; a segment rigid with the bar; means for clamping the segment to the aforesaid arm; vertically shiftable members forming a slideway for the slide, and means for actuating the slide.

13. In an engraving machine, the combination, with a movable pattern-holder, a tracer arranged to trace the pattern to be held by the pattern-holder, a movable work-blank-holder shiftable with the pattern-holder, a graver arranged to operate on the work-blank carried by the work-blank-holder, and means whereby the work-blank-holder is actuated by and during the actuation of the pattern-holder, of a guide by which the pattern-holder is guided in moving the pattern-holder relative to the tracer in tracing straight lines; a slide having a depending arm; a pivotal connection between the guide and the slide; a segment rigid with the guide; means for clamping the segment to the aforesaid arm; suitably supported vertically shiftable members forming a slideway for the slide, one of the said slideway-forming members being provided with a screw-threaded hole arranged parallel with the slide; a correspondingly threaded screw engaging the said hole, and means whereby the slide is shifted in the one direction or the other according as the screw is turned in the one or the other direction.

14. In an engraving machine, the combination, with a movable pattern-holder, a tracer arranged to trace the pattern to be held by the pattern-holder, a movable work-blank-holder shiftable with the pattern-holder, a graver arranged to operate on the work-blank carried by the work-blank-holder, and means whereby the work-blank-holder is actuated by and during the actuation of the pattern-holder, of a guide by which the pattern-holder is guided in moving the pattern-holder relative to the tracer in tracing straight lines; a slide; a pivotal connection between the guide and the slide, which pivotal connection is arranged transversely of the line of travel of the slide, means whereby the guide is secured in the desired adjustment around the said pivotal connection, depressible members forming a slideway for the slide and having depending stems, and spiral springs confined on the stems and normally acting to retain the said depressible members in their upper position.

15. In an engraving machine, a base; a tracer; a standard rigid with the base and bearing the tracer; a guide arranged rearward of the standard and instrumental in guiding a pattern-holder in moving the latter relative to the tracer; a slide; a pivotal connection between the guide and the slide, which pivotal connection is arranged transversely of the line of travel of the slide; means whereby the guide is secured in the desired adjustment around the said pivotal connection; depressible members forming a slideway for the slide and having depending stems; upright guides for the stems, which guides are hinged at their lower ends to the base; a cross-bar connecting the said last-mentioned guides together, which cross-bar is detachably fastened to the aforesaid standard, and means acting to retain the aforesaid depressible members in their upper position.

16. In an engraving machine, a base; a tracer; a standard rigid with the base and bearing the tracer; a guide instrumental in guiding a pattern-holder in moving the latter relative to the tracer; a slide; a pivotal connection between the guide and the slide; means whereby the guide is secured in the desired adjustment around the said pivotal connection; depressible members forming a slideway for the slide and having depending stems; upright guides for the stems, which guides are hinged at their lower ends to the base and detachably connected to the standard, and means acting to retain the aforesaid depressible members in their upper position.

17. In an engraving machine, a bar supported as required to render it capable of being swung in any direction as well as turnable in either direction, a pattern-holder operatively connected with the bar at one end of the bar, a work-blank-holder operatively connected with the bar at the other end of the bar, a graver arranged to operate on the work-blank to be carried by the work-blank-holder, means for guiding the work-blank-holder, a tracer arranged to trace the pattern to be held by the pattern-holder, and a guide by which the pattern-holder may be guided in moving the pattern-holder relative to the tracer.

18. In an engraving machine, a bar supported as required to render it capable of being swung in any direction as well as turnable in either direction, a pattern-holder operatively connected with the bar at one end of the bar, a work-blank-holder operatively connected with the bar at the other end of the bar, a graver arranged to operate on the work-blank to be carried by the work-blank-holder, means for guiding the work-blank-holder, a standard arranged forward of the pattern-holder, a tracer borne by the standard and arranged to trace the pattern to be held by the pattern-holder, and a guide by which the pattern-holder may be guided in moving the pattern-holder relative to the tracer, which guide is removably attached to the standard.

19. In an engraving machine, a rotatable pattern-holder having a range of movement vertically and adjustable laterally relative to the said range of movement, a tracer arranged to trace the pattern to be held by the pattern-holder, a rotatable work-blank-holder having a range of movement vertically and adjustable laterally relative to its said range of movement, a graver arranged to operate on the work-blank to be carried by the work-blank-holder, and means whereby the work-blank-holder is actuated by and during the actuation of the pattern-holder.

20. In an engraving machine, a rotatable pattern-holder normally adapted to be lowered and adjustable laterally relative to its range of movement vertically, a tracer arranged to trace the pattern to be held by the pattern-holder, a rotatable work-blank-holder having a range of movement vertically and adjustable laterally relative to its said range of movement, a graver arranged to operate on the work-blank to be carried by the work-blank-holder, means whereby the work-blank-holder is actuated by and during the actuation of the pattern-holder, and means normally retaining the pattern-holder in its upper position.

21. In an engraving machine, a rotatable pattern-holder normally adapted to be lowered and adjustable laterally relative to its range of movement vertically, a tracer arranged to trace the pattern to be held by the pattern-holder, a rotatable work-blank-holder normally adapted to be raised and adjustable laterally relative to its range of movement vertically, a graver arranged to operate on the work-blank to be carried by the work-blank-holder, and means whereby the work-blank-holder is rotated and raised by and during the rotation and lowering respectively of the pattern-holder.

22. In an engraving machine, a graver, a rotatable work-blank-holder arranged opposite to and movable vertically and horizontally across the engraving extremity of the graver, a tracer, a rotatable pattern-holder movable vertically and horizontally across and arranged opposite to the tracing extremity of the tracer, and means whereby the work-blank-holder is actuated by and during the actuation of the pattern-holder.

23. In an engraving machine, a graver, a rotatable work-blank-holder arranged opposite to and movable vertically and horizontally across the engraving extremity of the graver, a tracer, a rotatable pattern-holder movable horizontally and vertically across and arranged opposite to the tracing extremity of the tracer, means whereby the work-blank-holder is actuated by and during the actuation of the pattern-holder, and means normally retaining the pattern-holder at one extremity of its range of movement vertically.

24. In an engraving machine, a graver, a rotatable work-blank-holder arranged opposite to and movable horizontally across the engraving extremity of the graver, a tracer, a rotatable pattern-holder movable horizontally across and arranged opposite to the tracing extremity of the tracer, means whereby the work-blank-holder is actuated by and during the actuation of the pattern-holder, means instrumental in shifting the pattern-holder horizontally, and means whereby the last-mentioned means is secured in the desired adjustment.

25. In an engraving machine, a forwardly and rearwardly extending bar supported as required to render it capable of being swung in any direction as well as turnable in either direction; a bracket operatively and slidably mounted on the forward end of the bar; a pattern-holder operatively connected with the said bracket through the medium of a universal joint; a bracket operatively and slidably mounted on the rear end of the bar, a work-blank-holder operatively connected with the last-mentioned bracket through the medium of a universal joint, and means for guiding the work-blank-holder during the actuation of the bar.

26. In an engraving machine, a bar supported as required to render it capable of being swung in any direction as well as turnable in either direction; a bracket operatively engaging with and slidable endwise of the bar at one end of the bar; a pattern-holder operatively connected with the said bracket through the medium of a universal joint; a bracket operatively engaging with and slidable endwise of the bar at the other end of the bar; a work-blank-holder operatively connected with the last-mentioned bracket through the medium of a universal joint, and means for guiding the work-blank-holder during the actuation of the bar.

27. In an engraving machine, a tracer; a pattern-holder arranged opposite to and movable across the tracing extremity of the tracer; a graver arranged a suitable distance from the tracer; a work-blank-holder arranged opposite to and movable across the engraving extremity of the graver; a bar arranged between the graver and the tracer and supported to render the bar capable of being swung in any direction and turned in either direction; an operative connection between the pattern-holder and the bar; a bracket operatively engaging with and slidable endwise of the bar adjacent the work-blank-holder; a universal joint between the said bracket and the work-blank-holder, and means for guiding the work-blank-holder during the actuation of the bar.

28. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; a bar arranged between the graver and the tracer and supported to render the bar capable of being swung in any direction and turned in either direction, which bar is operatively connected at one end with the pattern-holder; a bracket operatively engaging with and slidable endwise of the bar at the other end of the bar; a universal joint between the said bracket and the work-blank-holder, and means for guiding the work-blank-holder to retain the work-blank in a vertical position during the actuation of the bar.

29. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; a bar arranged between the graver and the tracer and supported to render the bar capable of being swung in any direction and turned in either direction, which bar is operatively connected at one end with the pattern-holder; a bracket operatively engaging with and slidable endwise of the bar at the other end of the bar; a vertically arranged disk attached to the work-blank-holder and operatively connected with the said bracket through the medium of a universal joint, and means whereby verticality of the disk is maintained during the actuation of the bar.

30. In an engraving machine, a tracer; a pattern-holder arranged opposite to and movable across the tracing extremity of the tracer; a graver arranged a suitable distance from the tracer; a work-blank-holder arranged opposite and movable across the engraving extremity of the graver; a bar arranged between the graver and the tracer and supported to render the bar capable of being swung in any direction and turned in either direction, which bar is operatively connected at one end with the pattern-holder; a bracket operatively engaging with and slidable endwise of the bar at the other end of the bar; a disk attached to the work-blank-holder and operatively connected with the said bracket through the medium of a universal joint, and means whereby the disk is guided to maintain the work-blank-holder in proper position relative to the graver.

31. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; a bar arranged between the graver and the tracer and supported to render the bar capable of being swung in any direction and turned in either direction, which bar is operatively connected at one end with the pattern-holder; a bracket operatively engaging with the bar at the other end of the bar; a disk attached to the work-blank-holder; a universal joint establishing operative connection between the disk and the bracket, and suitably supported antifriction balls affording bearing to the faces of the disk and spaced a suitable distance from and circumferentially of the axis of the disk.

32. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; an axle bearing the work-blank-holder; a bar arranged between the axle and the tracer and supported to render the bar capable of being swung in any direction and turned in either direction, which bar is operatively connected at one end with the pattern-holder; a bracket operatively engaging with and slidable endwise of the bar at the other end of the bar; a universal joint establishing operative connection between the bracket and the axle, and means for guiding and preventing endwise displacement of the axle to retain the work-blank of the work-blank-holder in a vertical position during the actuation of the bar.

33. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; an axle bearing the work-blank-holder; a bar arranged between the axle and the tracer and supported to render the bar capable of being swung in any direction and turned in either direction, which bar is operatively connected at one end with the pattern-holder; a bracket operatively borne by and slidable endwise of the bar at the other end of the bar; a universal joint establishing operative connection between the bracket and the axle, and means for guiding the axle to retain the work-blank of the work-blank-holder in a position at a right angle to the axle during the actuation of the bar.

34. In an engraving machine, a tracer; a pattern-holder arranged opposite and movable across the tracing extremity of the tracer; a graver arranged a suitable distance from the tracer; a work-blank-holder arranged opposite and movable across the engraving extremity of the graver; an axle bearing the work-blank-holder; a bar arranged between the axle and the tracer and supported to render the bar capable of being swung in any direction and turned in either direction, which bar is operatively connected at one end with the pattern-holder and at its other end with the axle, and means whereby horizontality of the axle is maintained and endwise displacement thereof is prevented during the actuation of the bar.

35. In an engraving machine, a stationary frame-work; a movable pattern-holder; a movable work-blank-holder; an axle bearing the work-blank-holder; means whereby motion is transmitted to the axle from the pattern-holder during the actuation of the pattern-holder; a disk mounted on and attached to the axle; two frames rigid with the stationary frame-work and arranged at opposite sides respectively of the disk and having the configuration required to accommodate movement of the axle during the actuation of the pattern-holder, and antifriction bearings between the disk and the frames at suitable intervals circumferentially of the axle.

36. In an engraving machine, a movable pattern-holder; a movable work-blank-holder; an axle bearing the work-blank-holder; means whereby motion is transmitted to the axle during the actuation of the pattern-holder; a disk mounted on and attached to the axle; two stationary frames arranged at opposite sides respectively of the disk and having the configuration required to accommodate movement of the axle during the actuation of the pattern-holder; antifriction balls interposed between the disk and the frames at suitable intervals circumferentially of the axle, and screws partially embracing and affording bearing to the said balls and screwed into the frames.

37. In an engraving machine, a movable pattern-holder; an axle arranged a suitable distance from the pattern-holder; means whereby motion is transmitted to the axle during the actuation of the pattern-holder; means whereby the axle is guided and prevented from endwise displacement, and an adjustable work-blank-holder supported from the outer end of the axle.

38. In an engraving machine, a movable pattern-holder; an axle arranged a suitable distance from the pattern-holder; a work-blank-holder supported from the axle; means whereby motion is transmitted to the axle during the actuation of the pattern-holder, and means for guiding the axle.

39. In an engraving machine, the combination of a shaft having an eccentric; means for actuating the shaft; a carrier-bar which at one end embraces the eccentric and at its other end is provided with a graver, which bar between the forward end of the graver and the eccentric has a slot which is arranged in suitable proximity to the graver and extends longitudinally of the carrier, and a pin which is arranged parallel with the shaft and engages the slot, which pin affords bearing and is stationary relative to the carrier.

40. In an engraving machine, the combination, with a suitably actuated work-blank-holder, and a longitudinally adjustable graver to enter or withdraw from the work-blank borne by the work-blank-holder according as the graver is actuated forwardly or rearwardly, of a suitably supported endwise shiftable carrier which bears the graver, and means for securing the graver in the desired adjustment.

41. In an engraving machine, the combination, with a suitably actuated work-blank-holder, and a graver to enter or withdraw from the work-blank according as the graver is actuated forwardly or rearwardly, of a suitably supported shaft having an eccentric; means for actuating the shaft; a graver-carrier which at one end embraces the eccentric and at its other end is provided at the top with a recess arranged longitudinally of the bar and engaged by the graver, which carrier between the forward end of the graver and the eccentric has a slot which extends longitudinally of the carrier; a pin which is arranged parallel with the shaft and engages the slot, which pin affords bearing and is stationary relative to the carrier, and a suitably supported slide bearing the said pin and the shaft, which slide is movable toward and from the work-blank-holder.

42. In an engraving machine, the combination, with a suitably supported shaft having an eccentric; a graver-carrier which comprises a suitably supported endwise shiftable bar which embraces the eccentric, and a pinion operatively mounted on the shaft, of a spur-gear meshing with the pinion; a suitably supported axle bearing the gear; a ratchet-wheel operatively connected with the gear and instrumental in actuating the aforesaid carrier; an arm journaled on and projecting laterally of the aforesaid axle; another axle borne by the arm and parallel with the first-mentioned axle; an upright link connected with and depending from the second-mentioned axle; an upright rod pivoted to and depending from the said link; a lateral bearing for the said rod; means acting to retain the rod in its lower and normal position; lever-mechanism for actuating the rod upwardly, and a pawl mounted on the second-mentioned axle and arranged to actuate the ratchet-wheel.

43. In an engraving machine, the combination, with a suitably supported shaft having an eccentric; a graver-carrier which comprises a suitably supported endwise shiftable bar which embraces the eccentric, and a pinion operatively mounted on the shaft, of a spur-gear meshing with the pinion; two reversely arranged ratchet-wheels operatively mounted on the hub of the gear and instrumental in actuating the aforesaid carrier; a suitably supported axle bearing the gear; an arm journaled on the said axle; another axle borne by the said arm and parallel with the first-mentioned axle; a link connected with and depending from the second-mentioned axle; a rod pivoted to the said link; a spring acting to retain the rod in its normal position; lever-mechanism for actuating the rod against the action of the spring, and two pawls mounted on the second-mentioned axle and instrumental in actuating the different ratchet-wheels respectively.

44. In an engraving machine, the combination, with a suitably supported shaft having an eccentric; a graver-carrier which comprises a suitably supported endwise shiftable bar which embraces the eccentric, and means for operating the shaft; of a wheel operatively mounted on the shaft and provided in its periphery with two diametrically opposite segmentally spherical recesses; a suitably applied bolt having a segmentally spherical portion which engages the one or the other of the said recesses according as the graver-carrier is in the one or the other of its positions, and means acting to retain the bolt in its operative position.

45. In an engraving machine, the combination, with a suitably supported and suitably actuated work-blank-holder, and a suitably supported graver which is movable to render it capable of entering and withdrawing from the work-blank of the work-blank-holder, and a stationary frame-work provided with a bracket, of an upwardly movable upright rod having lateral bearing in the bracket, which rod is normally in its lower position; lever-mechanism for actuating the said rod upwardly; stops for limiting the movement of the said rod, and mechanism whereby motion is transmitted from the said rod to the graver to cause the graver to enter or withdraw from the work-blank of the work-blank-holder.

In testimony whereof, I sign the foregoing specification, in the presence of two witnesses.

HARRY F. WHEDON.

Witnesses:
　C. H. DORER,
　B. C. BROWN.